US009268763B1

(12) United States Patent
Esho et al.

(10) Patent No.: US 9,268,763 B1
(45) Date of Patent: Feb. 23, 2016

(54) AUTOMATIC INTERPRETIVE PROCESSING OF ELECTRONIC TRANSACTION DOCUMENTS

(71) Applicant: SHELF.COM, INC., San Francisco, CA (US)

(72) Inventors: Dayo Esho, San Francisco, CA (US); Christopher Kline, Pacifica, CA (US); Stephen Philp, Redondo Beach, CA (US)

(73) Assignee: SHELF.COM, INC., Pacifica, CA (US)

( * ) Notice: Subject to any disclaimer, the term of this patent is extended or adjusted under 35 U.S.C. 154(b) by 0 days.

(21) Appl. No.: 14/689,440

(22) Filed: Apr. 17, 2015

(51) Int. Cl.
*G06F 17/24* (2006.01)
*G06F 17/30* (2006.01)
*G06F 17/27* (2006.01)
*G06F 17/22* (2006.01)

(52) U.S. Cl.
CPC .......... *G06F 17/248* (2013.01); *G06F 17/2247* (2013.01); *G06F 17/2705* (2013.01); *G06F 17/30011* (2013.01)

(58) Field of Classification Search
CPC ....... G06F 17/21; G06F 17/218; G06F 17/22; G06F 17/2247; G06F 17/2252; G06F 17/2288; G06F 17/24; G06F 17/248
USPC .......................... 715/229, 234, 235, 236, 242
See application file for complete search history.

(56) References Cited

U.S. PATENT DOCUMENTS 7,254,569 B2 * 8/2007 Goodman et al.
2002/0129016 A1 * 9/2002 Christfort ......... G06F 17/30905

(Continued)

FOREIGN PATENT DOCUMENTS

WO  WO 2015/006409 A1  1/2015

OTHER PUBLICATIONS

Parser; Jun. 26, 2009; Free On-Line Dictionary of Computing; pp. 1-2.*

*Primary Examiner* — Andrew Dyer
(74) *Attorney, Agent, or Firm* — Hickman Palermo Becker Bingham LLP

(57) ABSTRACT

In one embodiment, a data processing method comprises using a computer, receiving a first electronic document, wherein the first electronic document is structured according to a document structure, contains a plurality of content elements separate from the document structure, and contains a plurality of field identifiers and field values; using the computer, generating, based only upon the document structure and not using the content elements, a fingerprint value for the first electronic document; using the computer, determining whether the fingerprint value is in a stored fingerprint map of known fingerprint values; using the computer, when the fingerprint value is in the fingerprint map, retrieving a final template and a document parser that are associated with the fingerprint value, parsing the first electronic document using the document parser to identify the field identifiers and field values, and storing the field values in a record in a database; using the computer, when the fingerprint value is not in the fingerprint map, creating and storing a new final template for the first electronic document, wherein the new final template comprises field labels corresponding to the field identifiers, and creating and storing a new document parser that is configured to locate other field identifiers in other electronic documents that match the field identifiers of the first electronic document, and to extract other field values associated with the other field identifiers.

16 Claims, 16 Drawing Sheets

(56) References Cited

U.S. PATENT DOCUMENTS

| | | | |
|---|---|---|---|
| 2002/0138513 A1* | 9/2002 | Korotney et al. | 707/511 |
| 2004/0194112 A1* | 9/2004 | Whittenberger | G06F 17/30569 |
| | | | 719/310 |
| 2008/0034056 A1* | 2/2008 | Renger | G06F 17/30035 |
| | | | 709/217 |
| 2008/0147812 A1* | 6/2008 | Curtis | 709/206 |
| 2009/0125529 A1* | 5/2009 | Vydiswaran et al. | 707/100 |
| 2009/0144552 A1* | 6/2009 | Fort | 713/178 |
| 2009/0265607 A1* | 10/2009 | Raz et al. | 715/233 |
| 2009/0307256 A1* | 12/2009 | Tiyyagura | 707/102 |
| 2013/0024924 A1 | 1/2013 | Brady et al. | |
| 2013/0311860 A1* | 11/2013 | Kritt et al. | 715/205 |
| 2014/0052617 A1* | 2/2014 | Chawla et al. | 705/39 |
| 2014/0082480 A1* | 3/2014 | Ionescu et al. | 715/234 |
| 2014/0164352 A1* | 6/2014 | Denninghoff | 707/711 |
| 2014/0173744 A1* | 6/2014 | Borohovski et al. | 726/25 |

* cited by examiner

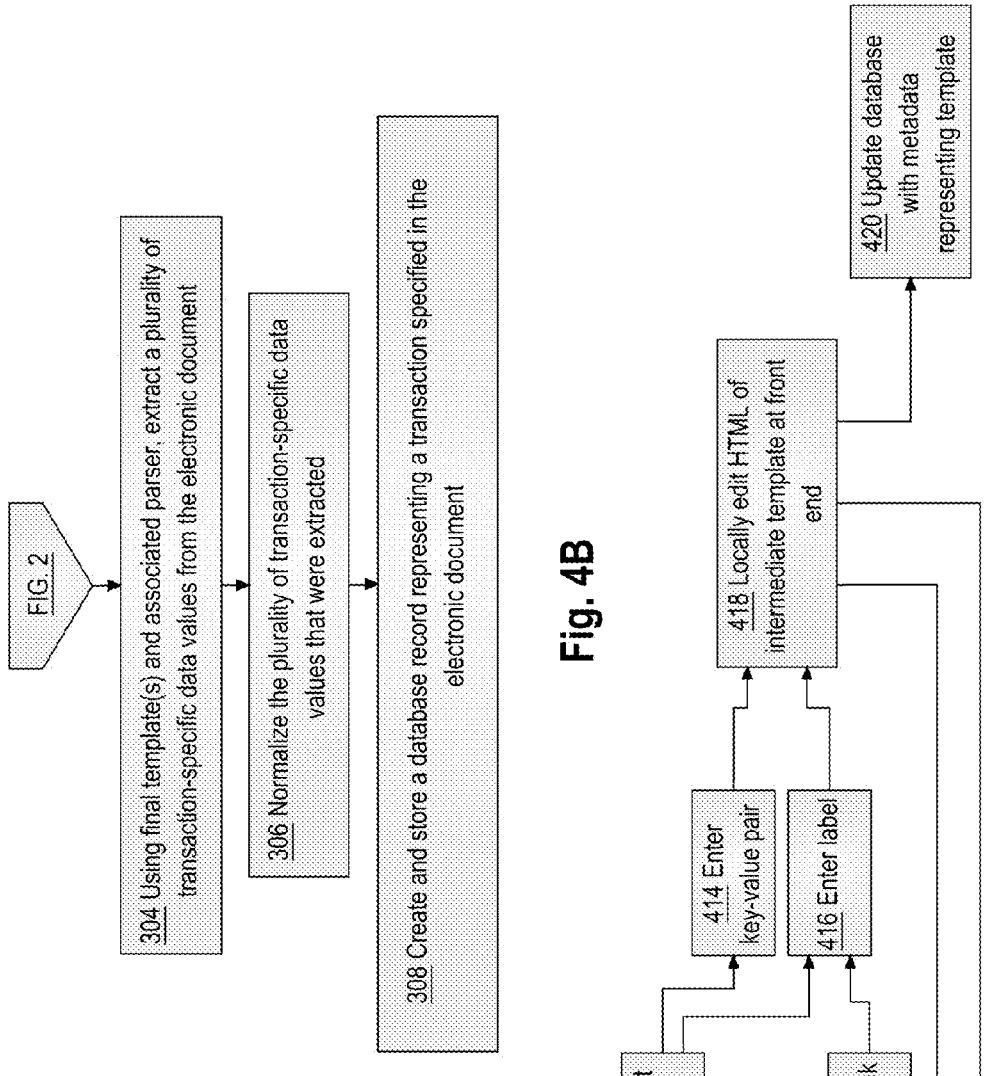

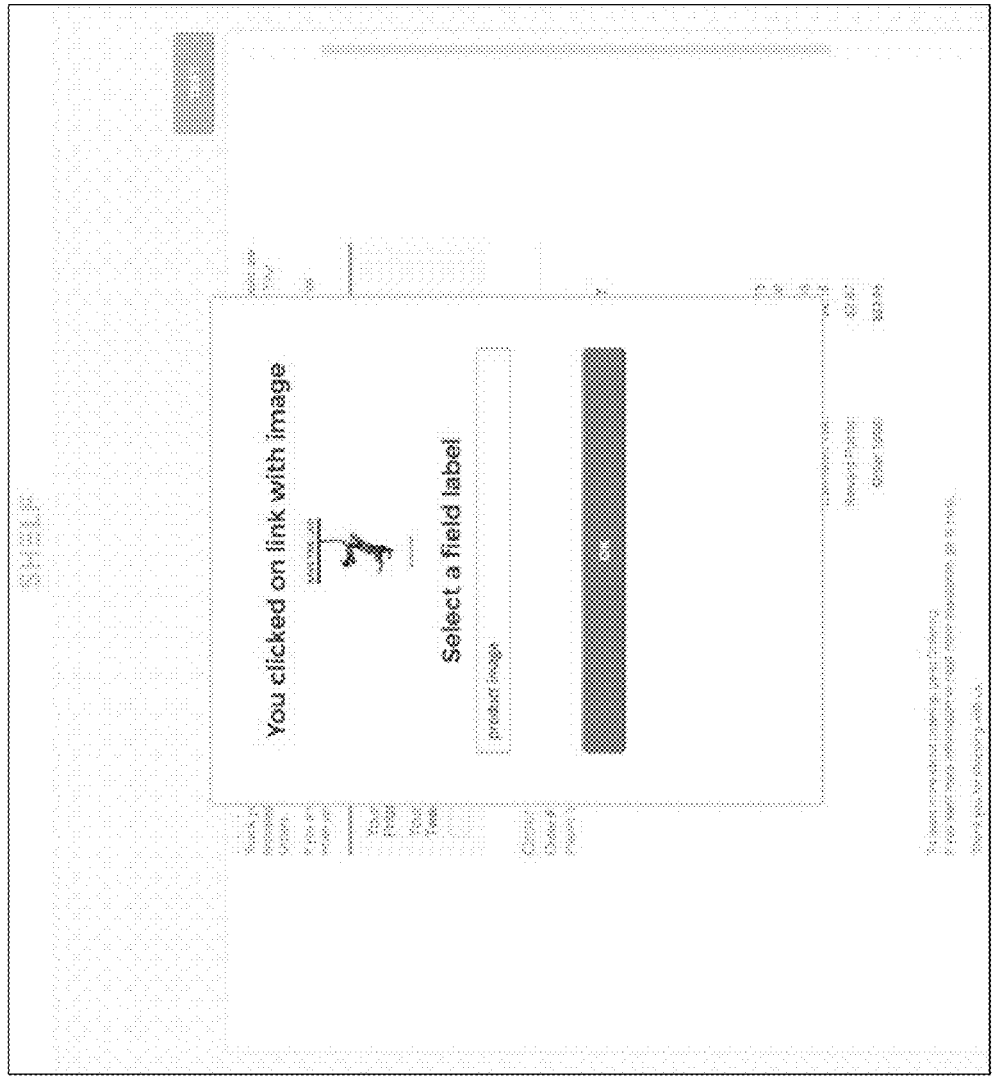

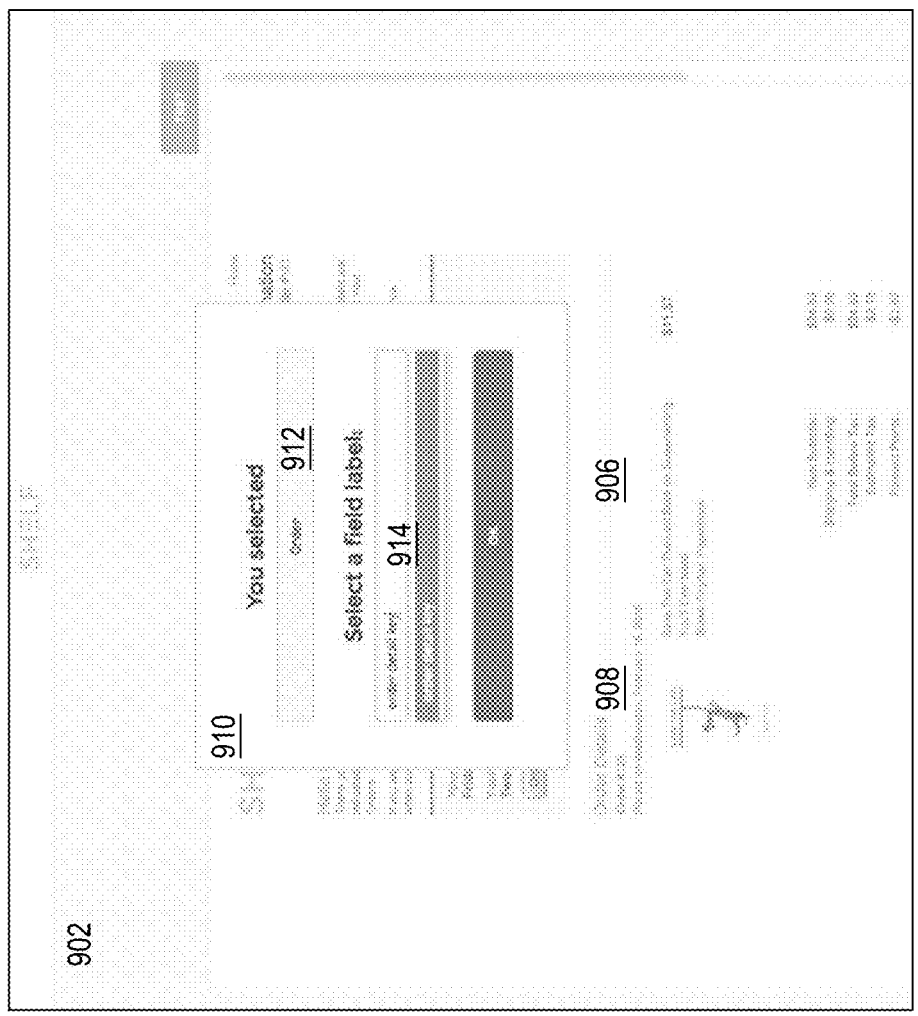

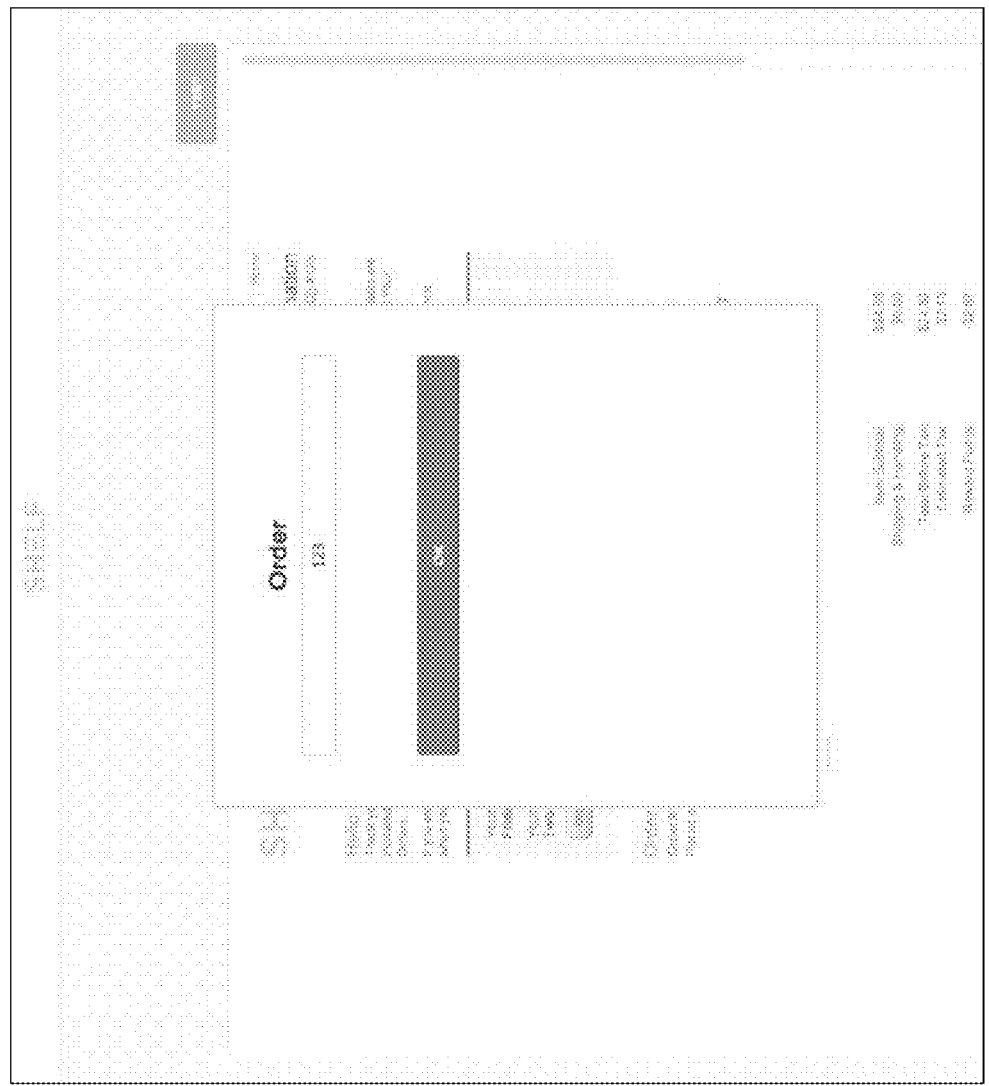

AUTOMATIC INTERPRETIVE PROCESSING OF ELECTRONIC TRANSACTION DOCUMENTS

FIELD OF THE DISCLOSURE

The present disclosure generally relates to data processing in the field of electronic document processing relating to transactions such as online purchases. The disclosure relates more specifically to techniques for automatically determining data values within electronic documents that vary in content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic commerce has become widespread and many individuals have become high-volume customers of online merchants. The rapid expansion of online commerce has led to an equally active secondary market in which individuals and businesses engaging in high volumes of online purchases have developed a need to resell merchandise in an efficient manner. A difficult problem in this context, however, is managing data relating to purchases and sales.

For example, a particular customer might buy twenty items from online merchants within a particular time period, and then wish to resell eight of the items after receiving the items. Resale might be motivated by dissatisfaction with received items, or a change in needs, or the desire to dispose of slightly used goods that are still in merchantable condition. To arrange resale, the owner of the items typically needs to create an item record in an online sales site such as EBAY, AMAZON, etc. To create the item record, the user normally is required to manually enter descriptive data about the item, as well as take or download images of the item.

The resulting data entry can impose a significant burden in terms of time or costs on the prospective seller, especially for parties who purchase a large quantity of goods and seek to resell a large quantity of goods. As a consequence, the online transaction platforms that facilitate the resale transaction ultimately do not process as many transactions as might be possible.

SUMMARY

The appended claims may serve as a summary of the invention.

BRIEF DESCRIPTION OF THE DRAWINGS

In the drawings:

FIG. 3 illustrates an example computer-implemented process of obtaining transaction data values from a set of electronic documents.

FIG. 4B illustrates a process of modifying an intermediate template.

FIG. 5B illustrates an example graphical user interface that is configured to receive data specifying a field label for an image within the electronic document of FIG. 4A.

FIG. 9C illustrates an example graphical user interface that is programmed to receive data specifying a field label for an order number field that the system has identified within an example receipt.

FIG. 12 illustrates an example graphical user interface in which an order number in a receipt has been recognized using a template and displayed.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

In one embodiment, a data processing method comprises using a computer, receiving a first electronic document, wherein the first electronic document is structured according to a document structure, contains a plurality of content elements separate from the document structure, and contains a plurality of field identifiers and field values; using the computer, generating, based only upon the document structure and not using the content elements, a fingerprint value for the first electronic document; using the computer, determining whether the fingerprint value is in a stored fingerprint map of known fingerprint values; using the computer, when the fingerprint value is in the fingerprint map, retrieving a final template and a document parser that are associated with the fingerprint value, parsing the first electronic document using the document parser to identify the field identifiers and field values, and storing the field values in a record in a database; using the computer, when the fingerprint value is not in the fingerprint map, creating and storing a new final template for the first electronic document, wherein the new final template comprises field labels corresponding to the field identifiers, and creating and storing a new document parser that is configured to locate other field identifiers in other electronic documents that match the field identifiers of the first electronic document, and to extract other field values associated with the other field identifiers.

The disclosure also encompasses a data processing system, a receipt processing computer, and other computing systems that are configured to perform the foregoing steps. For example, in various embodiments, special-purpose computers configured with logic as further described for FIG. 1 may be provided, or a general-purpose computer may be programmed as further described herein.

2. Example Receipt Processing Computer

Figure 1:
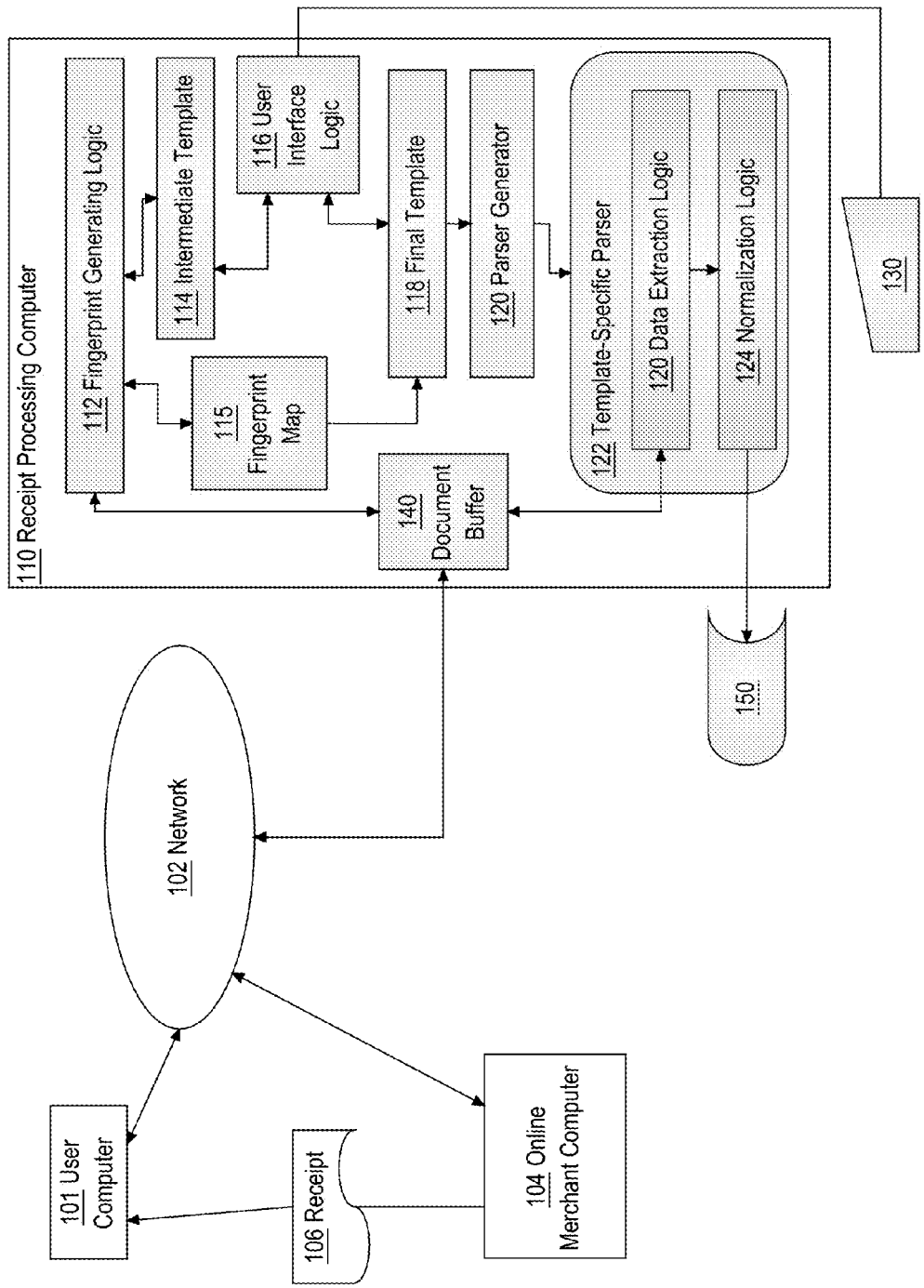
FIG. 1 illustrates a networked computer architecture, including one embodiment of a special-purpose computer, which can be used to implement an example.

FIG. 1 illustrates a networked computer architecture, including one embodiment of a special-purpose computer, which can be used to implement an example. In an embodiment, a user computer 101 is coupled via network 102 to an online merchant computer 104. User computer 101 broadly represents a client computer of any form including a mobile computer, smartphone, tablet computer, phablet computer-phone, laptop, netbook, ultrabook, desktop computer or workstation. For purposes of illustrating a clear example, a single user computer 101 is shown in FIG. 1 but other embodiments may use any number of user computers, and the disclosure herein specifically contemplates use with thousands or millions of user computers.

Network 102 broadly represents one or more local networks, wide area networks, internetworks or a combination and may use wired, wireless, terrestrial and/or satellite links.

Online merchant computer 104 represents one or more computers associated with an online service and may include one or more application server computers, database servers, web servers, and other elements. Online merchant computer 104 may be located in a private office, computing facility, or datacenter, or may be implemented using one or more virtual machine instances of a shared datacenter such as a cloud computing facility.

In one embodiment, user computer 101 connects to online merchant computer 104 via network 102 and enters into a transaction that results in the online merchant generating and sending an electronic receipt 106. The transaction may involve the purchase of goods or services, but a purchase is not required in all embodiments. The electronic receipt 106 may be delivered via e-mail, through an in-app facility, or through other means. In one embodiment, e-mail is used and the electronic receipt may be viewed by opening and displaying e-mail received from the online merchant computer 104 in Hypertext Markup Language (HTML) format. Thus, in one embodiment, electronic receipt 106 comprises an HTML e-mail that conforms to a document object model (DOM).

For purposes of clarity, FIG. 1 shows a single electronic receipt 106, but the user computer 101 may interact with any number of different online merchants, of which online merchant computer 114 of FIG. 1 is merely one example, resulting in generating and receiving any number of electronic receipts of which receipt 106 is merely one example. Thus, a single user computer 101 could be involved in hundreds of transactions that result in generating large numbers of electronic receipts 106, all of which may be forwarded to receipt processing computer 110 as further described herein.

In an embodiment, a receipt processing computer 110 is coupled to network 102 and comprises fingerprint generating logic 112, intermediate template 114, fingerprint map 115, user interface logic 116, final template 118, parser generator 120, template-specific parser 122, data extraction logic 120, normalization logic 124, terminal 130, document buffer 140, and database 150. For purposes of illustrating a clear example, a single receipt processing computer 110 is shown in FIG. 1 but other embodiments may use any number of computers, virtual machine instances, or other resources in physical datacenters, virtual data centers, or other configurations of processors, storage or other computing resources, and the disclosure herein specifically contemplates use with dozens or hundreds of such computers or instances.

In one embodiment, the fingerprint generating logic 112 may acquire copies of electronic receipt 106 through an authentication arrangement in which a user authorizes the system to receive data from an external system such as an e-mail server. For example, the fingerprint generating logic 112 or other logic in the receipt processing computer 110 may cooperate with a web server to provide a web-based dialog to the user computer 101 in which the user identifies an available external source and authorizes the system to obtain receipts there. OAUTH mechanisms may be used.

With OAUTH, the user computer 101 specifies, to receipt processing computer 110, an available external service where electronic receipts typically arrive, such as YAHOO mail, GMAIL from GOOGLE, OUTLOOK mail systems, etc. Assume for purposes of illustrating a clear example that the user computer specifies YAHOO mail. In response, under program control the receipt processing computer 110 creates a URL consisting of a request to the YAHOO mail service to log in to that service, and identifying the receipt processing computer as an OAUTH requester, and returns the URL to the user computer 101 for presentation using redirection or other mechanisms to the YAHOO service. For example, a parameterized URL of the form "https://login.yahoo.com/config/login?.src=oauth2& <other parameter values>" may be used in which the OAUTH parameter instructs the YAHOO service that an external service is requesting login. In response, the YAHOO mail service or other external service typically generates and presents a login screen to the user computer 101 that prompts the user to provide an account name and password.

In response to receiving such login credentials, the external service authenticates the credentials. If authentication is successful, then typically the external service generates and provides the user computer 101 with a confirmation screen that prompts the user to confirm that the external service may grant access, to the user's account, to the receipt processing computer 110. The confirmation screen may specify the level of access that the receipt processing computer 110 will receive, which may include in various embodiments viewing and managing email, viewing the user's email address, viewing the user's profile in the external service, and so forth. If the external service receives user input affirming the grant of access, then the external service stores a value or record in association with metadata for the user account indicating that the receipt processing computer 110 is authorized to access user data in the external service. Thereafter, the receipt processing computer 110 may issue requests, such as API calls packaged in parameterized URLs in HTTP requests to the external service, that programmatically retrieve information from the external service. For example, API calls may be used to retrieve the contents of the user's e-mail in-box in the external service, and copies of messages can be scanned, parsed or otherwise inspected to obtain copies of electronic receipts 106 as file attachments or from the body of e-mails. In this manner, the receipt processing computer 110 can periodically and automatically obtain receipts from user accounts in external systems.

In another embodiment, the fingerprint generating logic 112 is coupled to document buffer 140 to receive copies of electronic receipt 106 arriving via network 102; the document buffer may be used to temporarily hold any number of inbound electronic receipts for processing by the system as further described herein. Typically the user computer 101 might forward, via e-mail, the electronic receipt 106 to a receiving e-mail address associated with the receipt processing computer, e.g., "receipts@shelf.com", and the receipt processing computer 110 may implement a mail agent (not shown) to receive the e-mail and store a copy in document buffer 140 pending further processing. The buffer 140 may be structured in various embodiments as a FIFO queue, linked list, array, or other storage; what is important is that the buffer can store electronic receipts 106 as they arrive and provide them to fingerprint generating logic 112 and/or data extraction logic 120 on demand, on a schedule, or using other means.

The fingerprint generating logic 112 is also coupled to the intermediate template 114 and fingerprint map 115. In an embodiment, fingerprint generating logic 112 is configured to receive an electronic receipt 106 and generate a fingerprint of the electronic receipt as further described herein. The fingerprint generating logic 112 also is configured to inspect fingerprint map 115 to determine if the fingerprint is in the map as further described herein.

Intermediate template 114 may comprise a working copy of electronic receipt 106. The user interface logic 116 is configured to cause displaying a copy of the intermediate template 114 on the terminal 130 and to receive one or more modifications to definitions of fields and values within the intermediate template, as further described. The user interface logic 116 is further configured to create and store the final template 118 based upon the intermediate template 114 and the modifications that are received from the terminal 130, which may be associated with an editor, administrator or other user of the receipt processing computer 110. Terminal 130 may comprise a workstation, personal computer, laptop or other computing device with a keyboard, graphical display and pointing device.

The parser generator 120 is coupled to the final template 118 and is configured to generate and store the template-specific parser 122 based upon the final template. In an embodiment, the template-specific parser 122 comprises the data extraction logic 120 and normalization logic 124, and is configured to parse and generate sets of data attribute values for an electronic receipt 106 based upon the final template 118, as further described. Therefore, in one embodiment, data extraction logic 120 is coupled to the document buffer 140 to permit obtaining copies of electronic receipts for evaluation against the final template 118.

The terminal 130 may comprise a computer of any kind as previously described for the user computer 101. The document buffer 140 may comprise a specified area of memory or disk storage.

Database 150 may be implemented using one or more stored flat files, relational tables defined by a schema, object store, or other data store. In one embodiment, database 150 comprises a set of relational database tables managed using a relational database server, and may be hosted using one or more server computers. Both database 150 and receipt processing computer 110 may be located in a private office, computing facility, or datacenter, or may be implemented using one or more virtual machine instances of a shared datacenter such as a cloud computing facility.

For purposes of illustrating a clear example, FIG. 1 shows a single intermediate template 114, final template 118, and template-specific parser 122. However, in a practical embodiment, there may be any number of templates and parsers corresponding to receipts 106 that occur in different formats. For example, there may be different templates and parsers for each kind of merchant for which electronic receipts or other documents have been submitted to the system. Further, for each merchant, there may be multiple different templates and parsers that are configured to operate with different kinds of electronic documents that the merchant may provide to buyers or users as part of a transaction. Examples include a purchase order, payment receipt or order receipt, shipping confirmation, delivery confirmation, out of stock notification, etc.

3. Example Processes for Template Formation and Document Data Extraction

Figure 2:
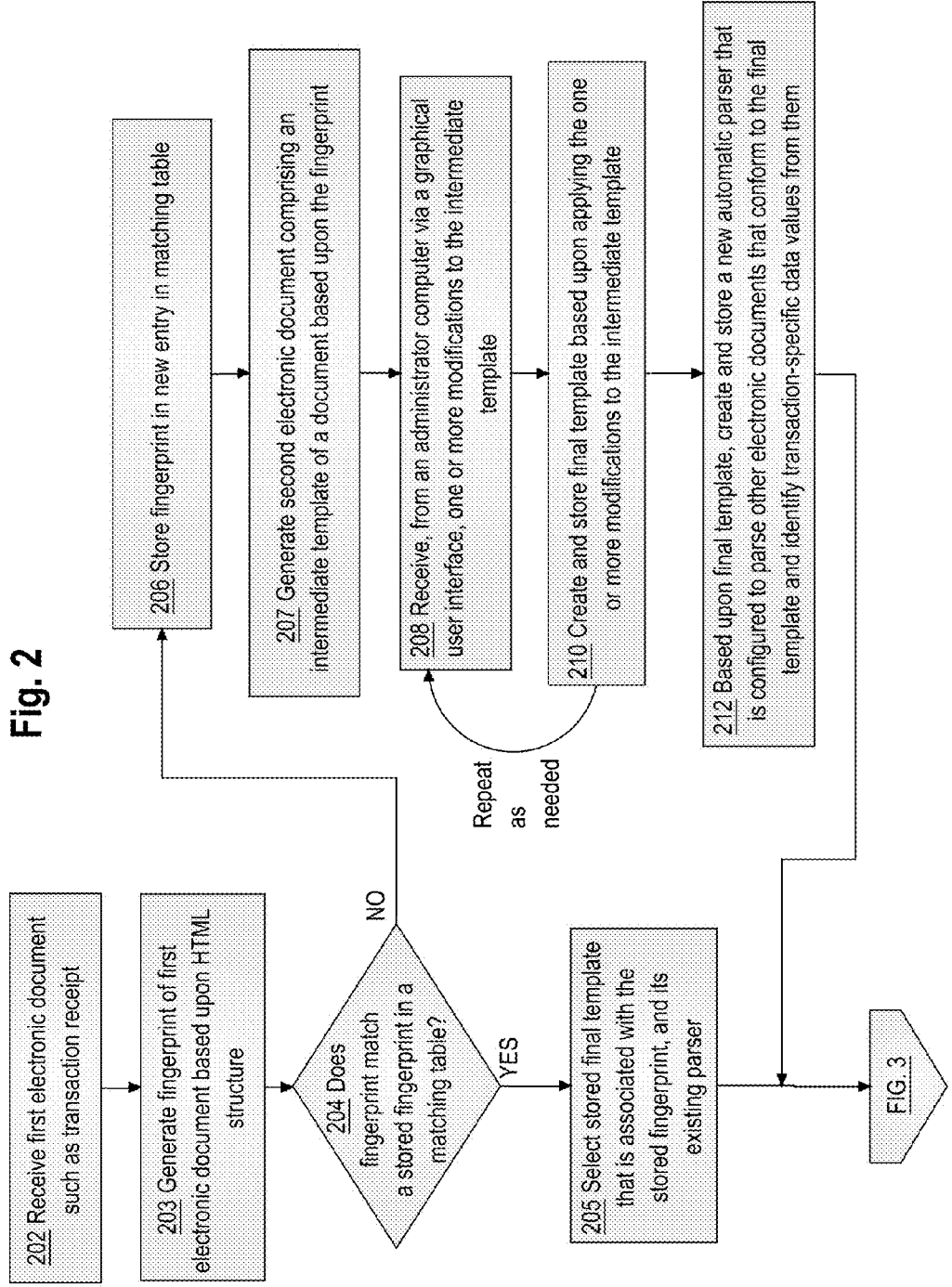
FIG. 2 illustrates an example computer-implemented process of generating a final template of an electronic document.

FIG. 2 illustrates an example computer-implemented process of generating a final template of an electronic document. FIG. 3 illustrates an example computer-implemented process of obtaining transaction data values from a set of electronic documents. FIG. 2, FIG. 3 may serve as an example of an algorithm and process flow that may be used as a programming guide to implement an embodiment using one or more stored programs prepared using any programming language or software development environment, such as JAVA, C, C++, OBJECTIVE-C, etc., and executed on a general-purpose computer. FIG. 2, FIG. 3 also illustrates an example of the functional operations that may be performed using the functional elements of receipt processing computer 110 as described for FIG. 1. For purposes of illustrating a clear example, some aspects of FIG. 2, FIG. 3 are described herein with reference to the functional elements of FIG. 1, but that specific environment is not required in all embodiments.

In an embodiment, at block 202, the process receives a first electronic document, such as a transaction receipt. For example, fingerprint generating logic 112 may receive the receipt 106 from document buffer 140 (FIG. 1). At block 203, the process generates a fingerprint of the first electronic document based upon the HTML structure of the document. In an embodiment, the fingerprint comprises an SHA-1 hash over the DOM structure of the electronic receipt 106, ignoring content of the receipt. The DOM structure may be extracted from the HTML, ignoring content, and output as a serialized stream that is provided to a hash generating method to produce the hash value.

With this process, successive messages that have the same DOM structure, but different substantive content, will cause generating the same fingerprint. Later steps are used to detect useful substantive content, based upon the template, from any number of inbound matching messages. "Useful substantive content," in the case of an electronic receipt, might include purchaser name, shipping address, line items indicating goods, prices, tax amounts, merchant name or seller name, name of online exchange or marketplace, domain name of online exchange or marketplace, URL of merchant, seller or online exchange, etc., but excludes marketing messages, merchant logos, merchant offers or partner offers or advertisements, etc.; useful substantive content is information that is useful in creating records of transaction data to facilitate reuse of the data, for example, to set up a resale transaction. "Substantive content" in general may include useful substantive content as well as marketing messages and the like.

Commercial software or public open source projects or libraries may be used both to traverse and extract DOM structure and generate a SHA-1 hash. In other embodiments, hash algorithms other than SHA-1 may be used. For example, other one-way hash functions with a low collision rate may be used, or other means of generating a unique identifier of the receipt 106 based upon structure rather than content. Hashing is not required.

In one variant, the fingerprint may be SHA-1 hash over the HTML structure of the email without including the content, and including the domain name of the sender of the message. In another variant, fingerprint generation may be modified to detect small variations in content of a message, and not to generate a new fingerprint in that case but to rely on an existing final template and parser that was previously created. As an example, the fingerprinting process may be configured to detect repetitive data appearing in a second message that is nearly identical to a previously received and fingerprinted first message, but results in a second fingerprint that is different than a first fingerprint for the first message. For example, assume that first and second messages are received and reflect transactions with the same merchant, but the first message reflects a purchase of a single line item, whereas the second message reflects a purchase of three items specified in three line items. In other words, except for three line items appearing in the same space as the single line item, the messages are outwardly identical. For such a case, the fingerprinting process may be configured to recognize close similarity in structure of the messages and to associate the second message with the same template as for the first message (and possibly the same final template and parser), even though the fingerprints of the two messages would be different.

In effect the fingerprinting examines creates a unique fingerprint value for every message that is received. At block 204, the process tests whether the fingerprint for the first electronic document matches a stored fingerprint in a matching table. For example, the process may compare the hash value produced from the first electronic document to fingerprint map 115, or perform a lookup in the fingerprint map, to determine whether a match exists and whether the fingerprint is already in the map.

If the fingerprint produced at block 203 is already in the fingerprint map or matching table based on the test of block 204, then at block 205, the process selects a stored final template that is associated with the stored fingerprint, and its existing parser. In an embodiment, fingerprint map 115 may comprise a set of rows, each of which is indexed by a fingerprint value and associates or maps that value to a location identifier of a corresponding stored final template, and a name or location identifier of a corresponding existing parser. Thus, for each unique fingerprint, the system stores both a final template and a parser. Each final template matches a plurality of messages that conform to the template, and the parser uses the template as a basis for determining the content or substantive values that are present in actual messages. For example, a final template would specify where a total order price is located in the electronic receipt 106, and the parser would be configured to determine from particular content—such as "$249.99"—that the characters in the location of the total order price represent the value $249.99 in US dollars. This process is described further in connection to FIG. 3, to which control passes after block 205, as seen in FIG. 2.

Returning to block 204, if the fingerprint produced at block 203 is not already in the fingerprint map or matching table based on the test of block 204, then at block 206, the process stores the fingerprint in a new entry in the matching table, such as in fingerprint map 115. At block 207, the process generates a second electronic document comprising an intermediate template of a document based upon the fingerprint. For example, a copy of the first electronic document is stored as the intermediate template, and the fingerprint map 115 is updated to associate a name or location of that intermediate template with the new fingerprint entry.

Figure 4A:
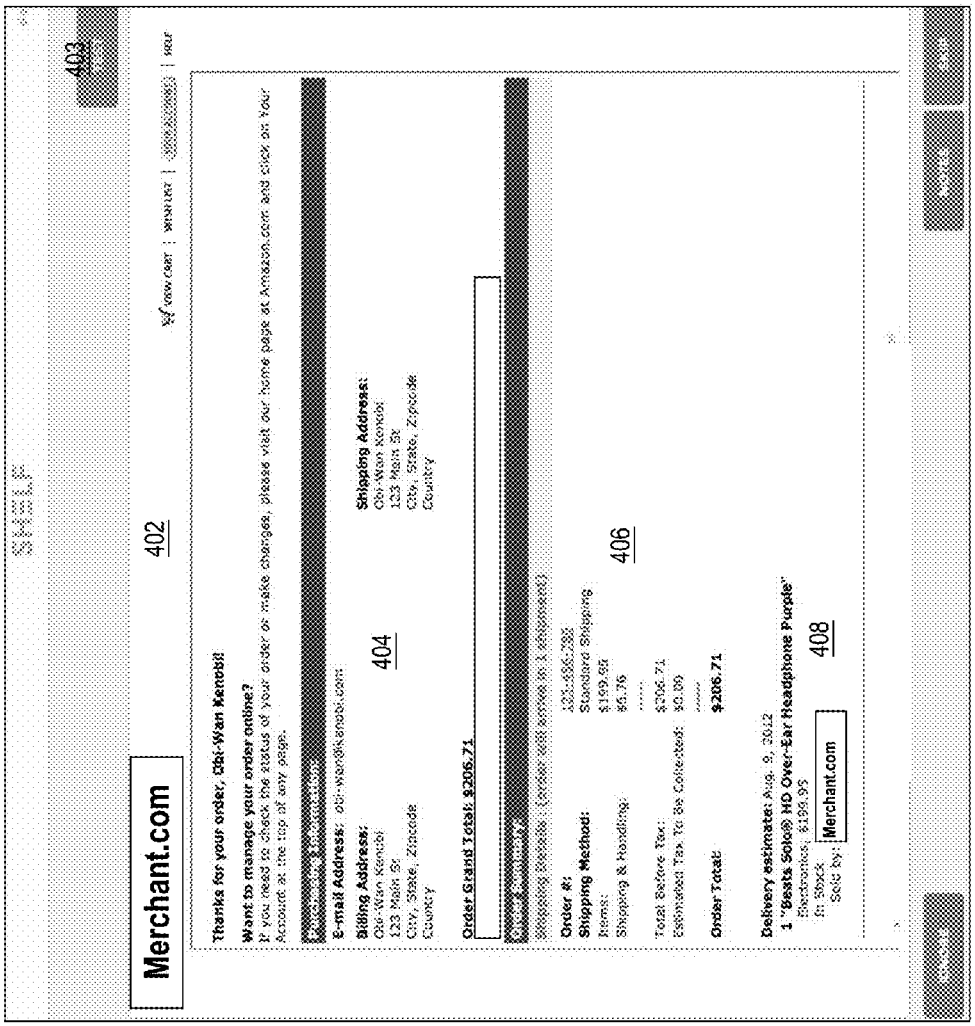
FIG. 4A illustrates an example electronic document consisting of a receipt for a purchase transaction.

FIG. 4A illustrates an example electronic document consisting of a receipt for a purchase transaction, which may serve as an intermediate template. FIG. 4A, and FIG. 5A through FIG. 12 inclusive, represent examples of user interface displays, functions and operations that may be generated or executed by the user interface logic 116 in operation. In other words, everything described herein as a function associated with FIG. 4A and FIG. 5A to FIG. 12 inclusive may be implemented by user interface logic 116, alone or in conjunction with the other functional elements of FIG. 1.

In the example of FIG. 4A, in visible form, an intermediate template 402 comprises a copy of a portion of an HTML e-mail that the merchant "Merchant.com" sent to an end-user as a receipt. The intermediate template 402 may be seen as a structured document that includes a purchaser information block 404, order summary block 406, delivery estimate block 408, and possibly other blocks. Each such block is defined by HTML tags and other structures that are independent of content items such as the customer address ("123 Main St"), order number, pricing, etc. In stored form, each text item or group of text items in the intermediate template 402 is associated in a database record with a key name and a field value. Such associations are created and maintained only if that text or group of items is a valid field in the intermediate template; there may be spurious text such as marketing messages, greetings, legal text, or other information in the e-mail message that does not need to form a part of key-value pairs for the intermediate template because that information is invariant or immaterial to a transaction record. An example key-value pair is {e-mail_address; john_doe@mail.com}.

FIG. 4A also includes a TEST widget 403 which, when selected, causes persistently storing the template (with any edits) to database 150 and permits testing the template against the original message upon which it was based, or other messages. For example, selecting the TEST widget 403 instructs the system to use the then currently existing final template associated with the current display to attempt to match to electronic documents that are available in the system. If a final template does not exist, then the initial template is stored as the final template and testing is initiated. As other drawing figures will show, the TEST widget 403 remains displayed in all the template displays and is typically invoked after a final template is prepared for the purpose of testing the accuracy of that final template in matching to existing electronic documents. Further, in an embodiment, selecting widget 403 causes storing key-value pairs in the database for all dynamic text that has been identified in the template.

In some embodiments, after block 207, a validation step is performed with the initial template. For example, validation of the HTML source of the first message may be performed to ensure that the HTML is well formed. Validation may involve correcting the HTML to ensure its form or structure is complete and correct. Validation may involve deleting tracking pixels in images that are linked to URLs that would otherwise trigger network requests if the message is reloaded in a browser or HTML email client.

At block 208, the process receives, from an administrator computer via a graphical user interface, one or more modifications to the intermediate template. For example, block 208 may involve displaying the intermediate template in a GUI panel and receiving input, such as clicks using a pointing device, identifying areas of the template to modify by associating different kinds of field values with the template. An example of this manner of modification is discussed further herein in connection with the other drawing figures. Thus, in one approach, user interaction with a GUI view of the intermediate template provides a point and click method for non-engineers to specify where in the message important values are located, and to update the template.

At block 210, the process creates and stores the final template based upon applying the one or more modifications to the intermediate template. Block 210 may involve editing the intermediate template as an HTML document using front-end logic that updates a view of the intermediate template as the editing is done. Finalized templates are filled out with instructions about what field values are located at different locations in the structure of the electronic document.

At block 212, based upon the final template, the process creates and stores a new automatic parser that is configured to parse other electronic documents that conform to the final template and to identify transaction-specific data values from them.

The foregoing process of FIG. 2 may be repeated any number of times to process any number of received electronic messages, to result in creating and storing a plurality of different final templates for different sources. For example, the process may be used to process dozens of different electronic receipts from different online merchants, each with a different HTML structure, to result in creating and storing final templates that are capable of matching to later inbound messages received from the same sources after selection using fingerprints. Thus, when a new message is received and matches an existing template, then automated data extraction occurs using the corresponding parser, and the database 150 may be updated with a record specifying the details of a new transaction.

It will be clear from the foregoing that when a new message comes in, a fingerprint is determined for the message, and the fingerprint matches an existing list of fingerprints that maps to a parser, then the parser is invoked and the data is extracted; there is no need to create a template in that case. If the merchant changes the format of the message, then the fingerprint will not match, so a new template is created and used to make a parser. The presence of new retailers also could create the need for new template.

Referring now to FIG. 3, in an embodiment, at block 304, using the final templates and associated parsers that have been defined in previous iterations of FIG. 2, the process extracts a plurality of transaction-specific data values from the electronic document.

Block 304 may be reached, for example, as part of processing a first electronic document received as a test item or example, or as part of a process flow that includes processing a large number of different electronic documents received at the receipt processing computer 110 from a large number of different user computers 101, and may include processing any number of electronic documents including electronic receipts. For example, receipt processing computer 110 may be implemented as a public or open online service to which receipts or other electronic documents may be forwarded using e-mail, other transport, or uploading operations initiated from different user computers 101 at arbitrary times. As a specific example, a user associated with user computer 101 may establish an account at receipt processing computer 110 having account credentials stored in database 150 and associated with an e-mail address of an e-mail account of the user. Periodically, as the user computer 101 receives different electronic receipts from different merchants as a result of different online purchases by the user, the user computer may forward copies of the electronic receipts 106 to the receipt processing computer 110 for processing. Block 304 could be reached when such receipt is received, for example, and when the process has determined that a matching fingerprint is stored, and identified the final template and parser for that fingerprint using the fingerprint map 115.

Typically block 304 involves obtaining useful substantive content, as specified above, from the electronic document. Some data may be captured optionally and, in a resale embodiment or environment, may be omitted. For example, the billing address shown in a product purchase receipt probably is not relevant to a later resale of the product that was purchased, but could be useful as a contact item. Similarly, obtaining tracking numbers for courier services could be performed, but might not be relevant in the particular case of an application supporting resale of products identified in receipts. Or, the tracking numbers could be used for a special purpose such as setting a flag indicating that a particular carrier had previously handled shipment of the goods, for possible selection as a carrier involved in a resale shipment.

In an embodiment, parsing involves data extraction, classification and normalization. Block 304 may represent data classification and extraction. In extraction, in one embodiment, the process is configured to use the final template as a basis for matching values in the received electronic document that match tags in the final template, and to copy substantive content from the received electronic document to store in persistent storage in association with tag identifiers.

In one embodiment, the final template has HTML keywords or tags that reference labels of the template. Extraction comprises finding a first label in the template, for example by traversing the DOM tree of the template. Then the process examines HTML of the template that surrounds the label, and searching for matching HTML of a received electronic document or receipt in the same logical location in the DOM tree of the received electronic document or receipt, so that substantive content within or near that HTML and up to the next tag can be copied and used as substantive values for fields, in a database record, corresponding to the labels. Any arbitrary intervening text may be ignored.

Other extraction techniques may be used; what is important is that the final template signals the locations in the DOM tree or HTML at which useful substantive content begins, and the process can scan a received electronic document starting from those locations up to a next location or tag, as signaled in the final template, to copy or extract all useful substantive content relating to the first location or tag. Further, modification operations based upon administrative user review and input, as further described, may involve identifying a range of text that corresponds to a location, tag or field label.

In some embodiments, block 304 or program logic implementing the process of FIG. 3 or block 304 may include special processing code to identify and match text that also appears before a tag or location and associate that earlier text with the tag. For example, programmed rules or procedures may specify that upon identifying a tag in the received electronic document, the process should backtrack and then scan from an earlier point up to the tag, copying text that appears before the tag and associating that copied text with the tag. In one approach, the template may be used as a basis to construct, under program control, one or more regular expressions in memory, where each of the regular expressions is associated with one of the tags in the final template, and then the received electronic document may be matched to the regular expressions to locate text that should be copied and associated with a particular tag. Different regular expressions may be used for text, links, and image sources within the received electronic document.

Block 306 may represent normalization, specifically normalizing the plurality of transaction-specific data values that were extracted. Normalization may involve removing unnecessary punctuation, correcting inconsistent capitalization, reordering words within a text item to improve clarity, etc.

At block 308, the process creates and stores a database record representing a transaction specified in the electronic document.

Referring now to FIG. 4B, in one embodiment, a process of editing an intermediate template may take several forms. In one approach, the process receives input specifying highlighting a range of text in a view of the template in a GUI, at block 410. The process then receives input specifying a static label for the field, such as "Shipping Address," indicating that the highlighted text is a shipping address in the receipt. Alternatively, a different selection may signal entering a key-value pair in which both a key name and a substantive value for that key are received, at block 414. Values may be for attributes of keys or attributes of fields in the template.

At block 418, the in-memory HTML source code representation of the intermediate template is edited based upon the input of blocks 410, 412, 414, 416; thus, blocks 410 to 418, inclusive may involve front-end GUI operations that act locally upon tag values of an in-memory HTML source code copy of the intermediate template. In contrast, selecting the TEST widget 403 (FIG. 4A) causes updating the database 150 with the edits, such as to substitute the newly entered key value as a field label for the text that was highlighted. This process may be repeated any number of times for any number of modifications to the intermediate template.

Figure 5A:
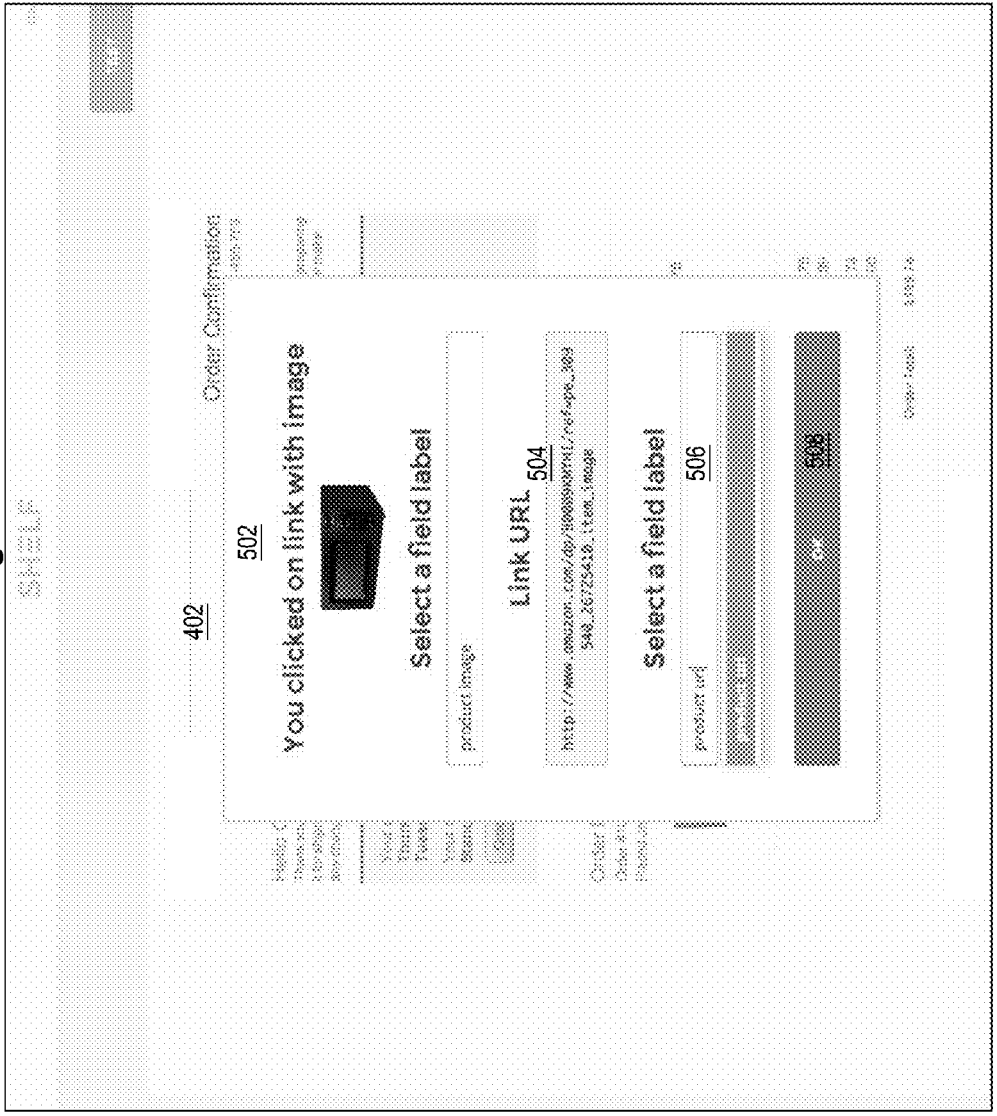
FIG. 5A illustrates an example graphical user interface that is configured to receive data specifying a field label and image link for an image within the electronic document of FIG. 4A.

When a modification is to be applied to a hyperlink within the receipt or template, then in block 412, the link is selected, rather than highlighted. The link may be relabeled at block 416 and the database is updated at block 418. FIG. 5A illustrates an example graphical user interface that is configured to receive data specifying a field label and image link for an image within the electronic document of FIG. 4A. In FIG. 5A, user input specified clicking on a link of a product image. In response, the user interface logic 116 causes displaying a GUI panel 502 that is superimposed over the template 402. The URL for the selected link is shown in a Link URL region 504, and the user is prompted to enter a new field label in a text field 506, which may be persisted to the database 150 by selecting an OK widget 508.

FIG. 5B is similar to FIG. 5A and illustrates an example graphical user interface that is configured to receive data specifying a field label for an image within the electronic document of FIG. 4A. FIG. 5B illustrates the case of assigning a field label to a product image without also specifying or changing a link associated with the image.

Figure 6:
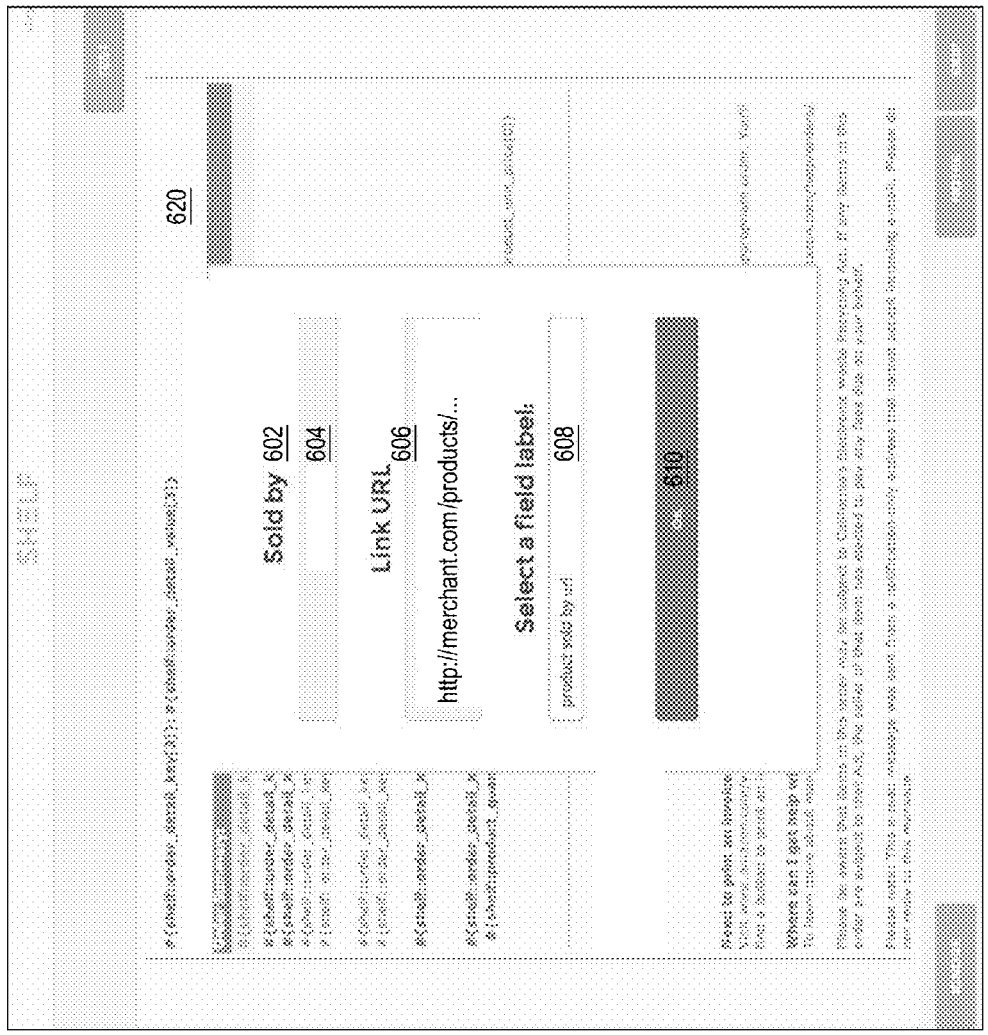
FIG. 6 illustrates an example graphical user interface that is configured to receive data specifying a merchant order identifier as a particular key value.

FIG. 6 illustrates an example graphical user interface that is configured to receive data specifying a merchant order identifier as a particular key value. FIG. 6 illustrates an editing example GUI panel 602 that is similar to FIG. 5A but involves editing a final template 620 in which a link has been selected and the link is associated in the final template with a key name 604 of "Sold by" and a link URL value 606 that indicates a link in the merchant's website to a product description page. The panel 602 includes a field label text field 608 that is configured to receive input specifying a field label and an OK widget 610 that is configured to persist the field label to the database 150.

Figure 7:
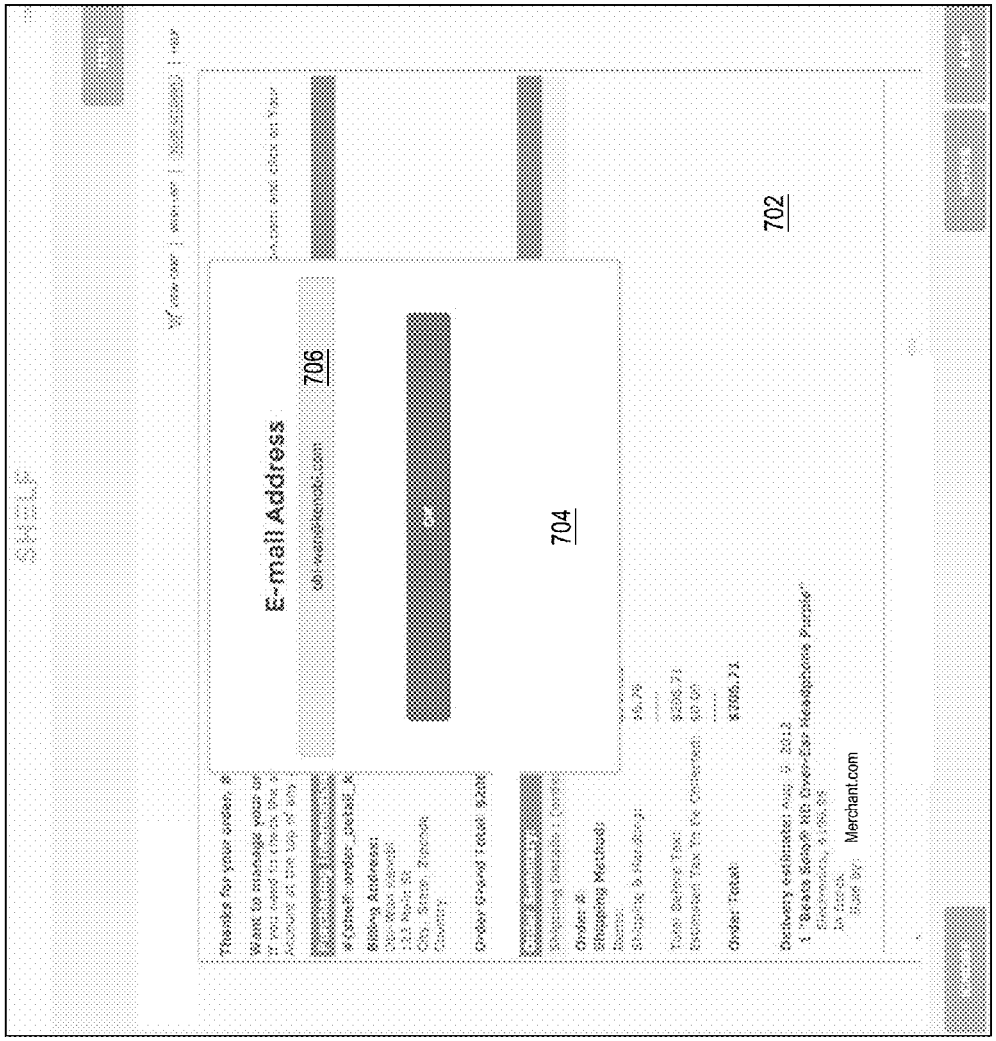
FIG. 7 illustrates an example graphical user interface that is configured to receive data specifying an e-mail address as a particular key value.

FIG. 7 illustrates an example graphical user interface that is configured to receive data specifying an e-mail address as a particular key value. In FIG. 7, an example receipt 702 has been displayed and partly processed and templatized, and the user has selected an e-mail address field in the receipt. In response, a GUI panel 704 is displayed and indicates the e-mail address that the system has recognized and stored, in field 706. Because this is a static value with a fixed label, display is the only option and editing the address is not supported.

Figure 8:
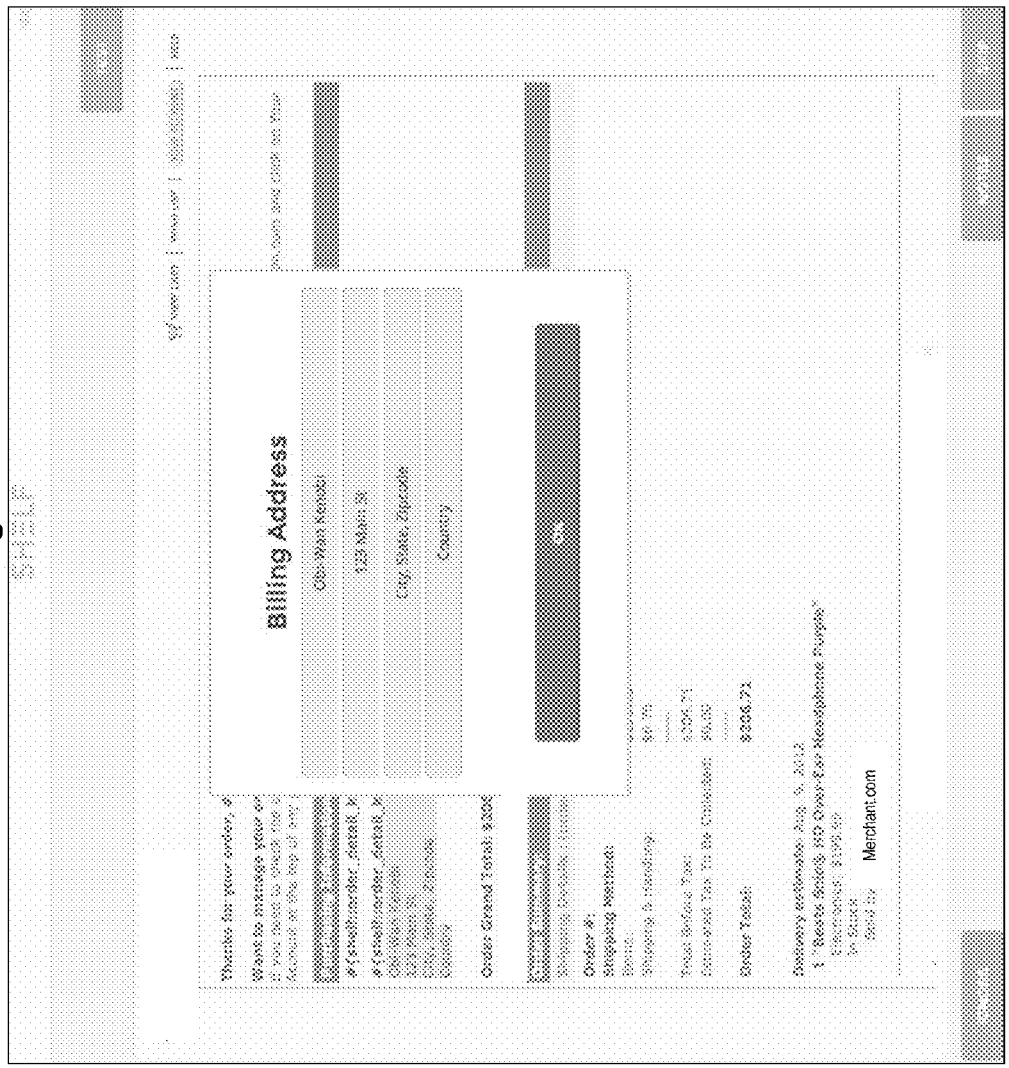
FIG. 8 illustrates an example graphical user interface that is configured to receive data specifying billing address information as a particular key value.

FIG. 8 illustrates an example graphical user interface that is configured to receive data specifying billing address information as a particular key value. FIG. 8 is similar to FIG. 7 in displaying static output of parsing operations without editing options. FIG. 12 similarly displays the static value of an order number.

Figure 9A:
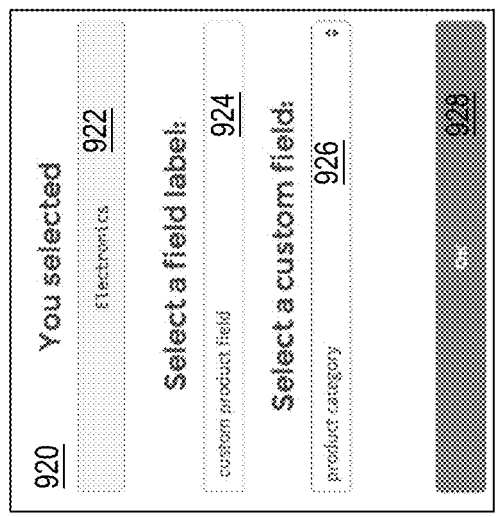
FIG. 9A illustrates an example graphical user interface that is configured to receive data specifying a custom field.

FIG. 9A illustrates an example graphical user interface that is configured to receive data specifying a custom field. In FIG. 9A, selection of a customizable field in a receipt such as that of FIG. 4, FIG. 7 causes the system to display GUI panel 920 which comprises a field identifier 922, field label widget 924, custom field widget 926 and OK widget 928. In this arrangement, the user can see the current field identifier 922, and can use widget 924 to enter a custom product field label and/or use widget 926 to select a custom product category. Selecting the OK widget 928 causes the system to persistently store the values from widget 924, 926 in association with the current template.

Figure 9B:
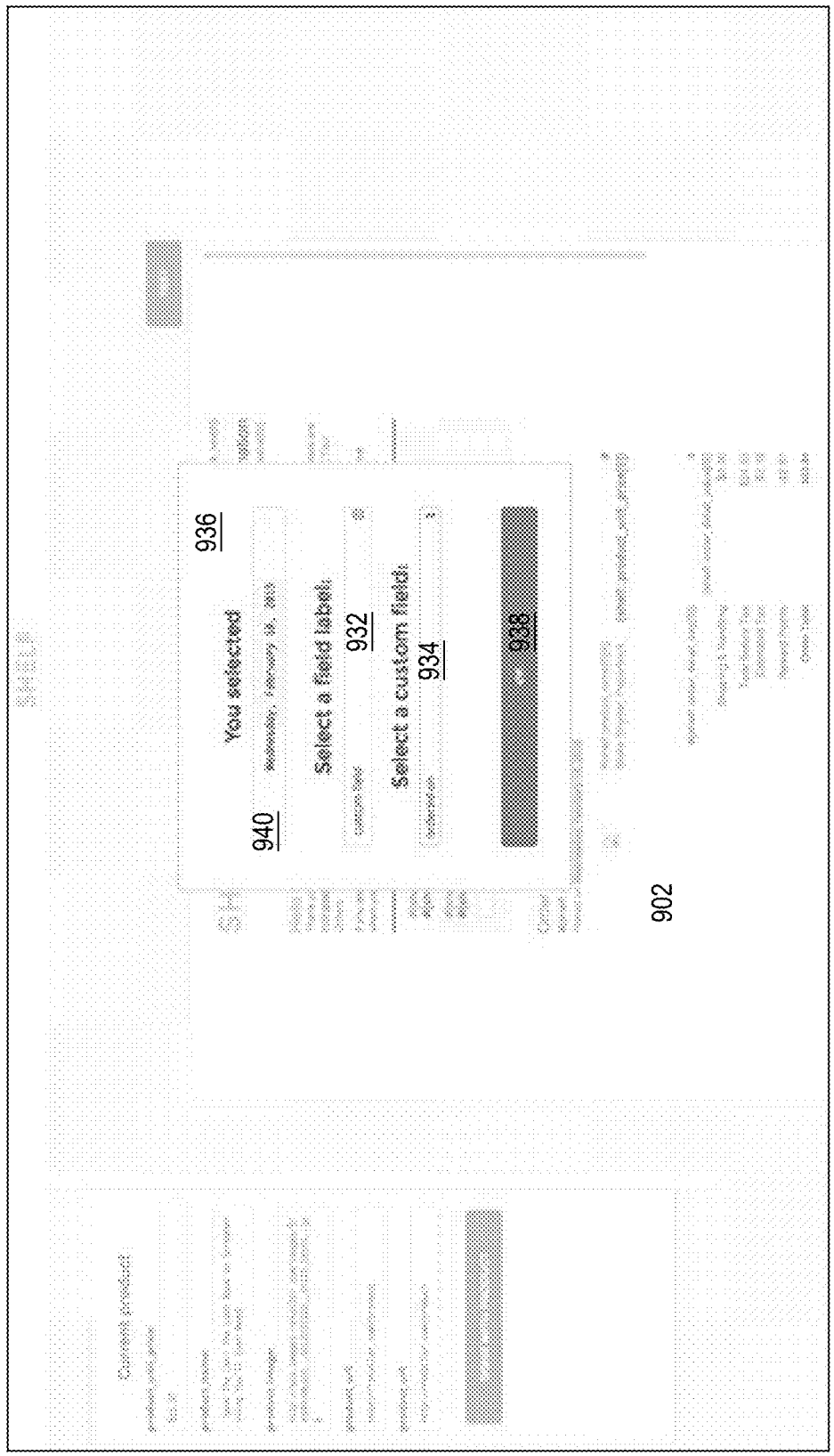
FIG. 9B illustrates a second example graphical user interface that is configured to receive data specifying a custom field.

FIG. 9B illustrates a second example graphical user interface that is configured to receive data specifying a custom field. In this case the user has selected a date field 940 from the receipt 902 appearing in the background of the screen conceptually under GUI panel 936, which comprises a field label box 932 and custom field widget 934. These fields accept user input specifying a field label and custom field identification; selection the OK widget 938 causes persistently storing these values as part of a template.

FIG. 9C illustrates an example graphical user interface that is programmed to receive data specifying a field label for an order number field that the system has identified within an example receipt. In this example, a receipt 906 illustrated in a background portion of the screen display 902 comprises an order field 908 having a name "Order #" and a value "123"; the system has recognized this field, received user input selecting that field for relabeling and has generated and displayed a panel 910 that is programmed to identify the selected field at field ID 912 and to receive text input for a field label at text box 914. Selecting an OK widget 916 causes storing the specified field label as an indicator of the field that was recognized.

Figure 10A:
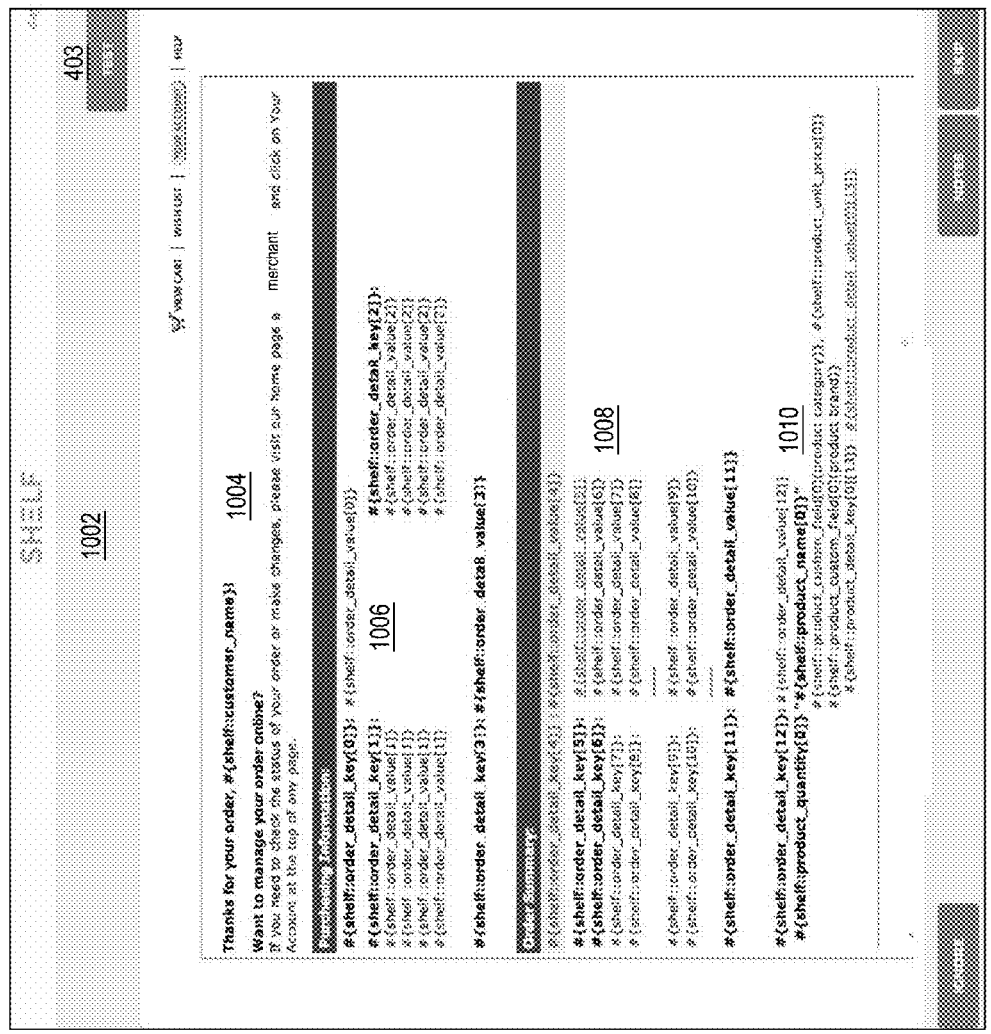
FIG. 10A illustrates an example final template based upon the document of FIG. 4A.
Figure 10B:
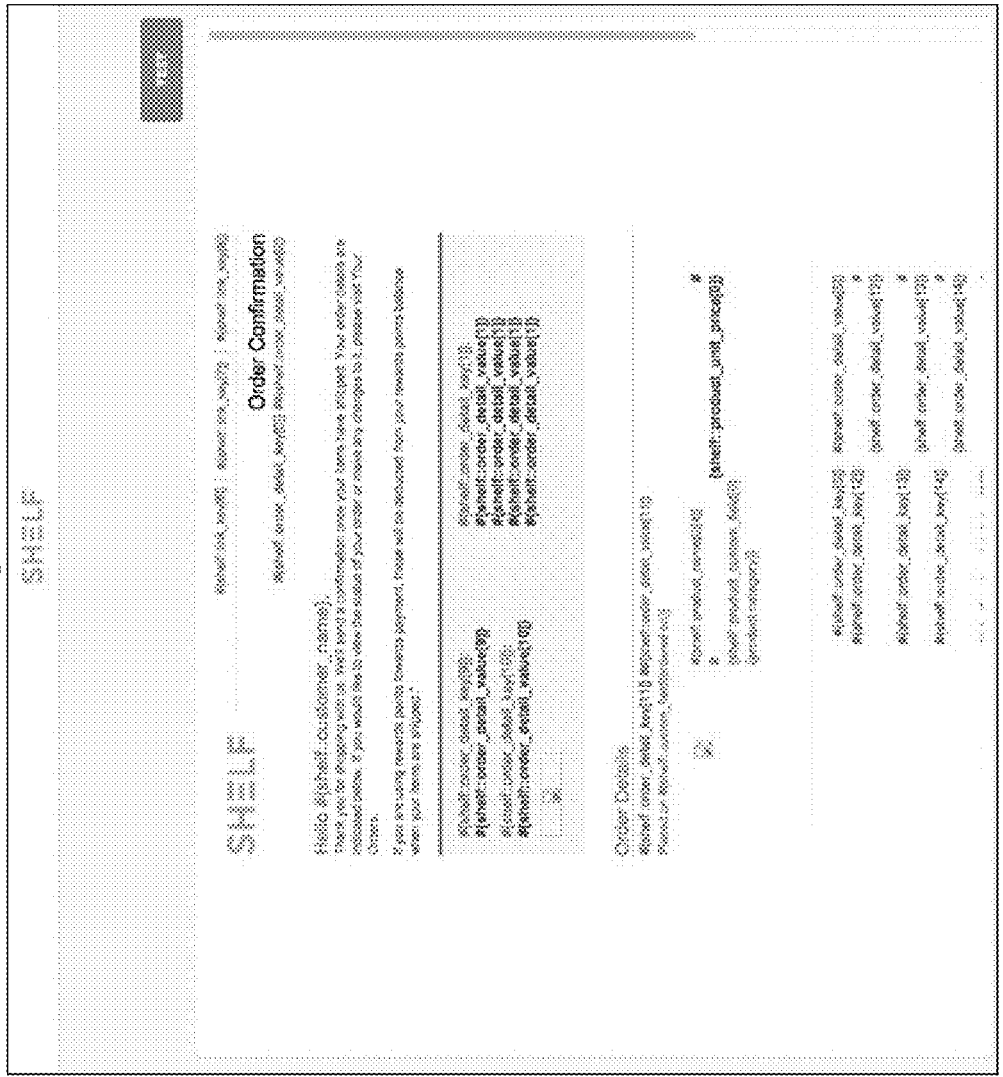
FIG. 10B illustrates a second example final template based upon the document of FIG. 4A in a slightly different format.

FIG. 10A illustrates an example final template based upon the document of FIG. 4A. FIG. 10B illustrates a second example final template based upon the document of FIG. 4A in a slightly different format. In the final template, all dynamic text is represented as keys and values. A particular key may be associated with values that are present in more than one line or text area of the original electronic receipt. For example, a key named order_detail_key[1], for a customer address, may be associated with multiple values specified as order_detail_value[1] and originally appearing in multiple successive lines of the electronic receipt; after parsing, all such lines will be associated with order_detail_key[1] in the database. Thus, a particular key is not required to be associated with a single discrete value, or even a single value on a single line of the receipt.

FIG. 12 illustrates an example graphical user interface in which an order number in a receipt has been recognized using a template and displayed.

In an embodiment, the user interface logic 116 may be configured to receive input specifying a type of message that is represented in an e-mail, such as purchase order, payment receipt or order receipt, shipping confirmation, out of stock notification, etc.

4. Merging Related Electronic Documents

In one embodiment, the receipt processing computer 110 may be programmed with the logical elements of FIG. 1 to perform matching of electronic documents that are related in a transaction. For example, an order receipt, shipping confirmation, and delivery notification may be related in the database 150 by forming final templates for each of them and creating and storing a mapping of related final templates in the database. In one approach, database 150 may store a Related Templates table in which rows relate to one kind of transaction or one kind of online merchant or other source, and columns store identifiers of final templates for a plurality of individual electronic documents that are related to one another and/or normally used in a single transaction by the same online merchant or other source.

With this approach, the receipt processing computer 110 may be programmed to search the database 150, after processing a first received electronic document, based upon a key that identifies a first final template that was used for that document, to determine if other final templates are associated with the first final template. If so, then the receipt processing computer 110 may search the database 150 to identify any previously processed substantive content for other electronic documents that relate to the same transaction as described in the most recently processed electronic document. If any are found, then substantive content of the most recently processed electronic document may be stored in the same table or row as the content for related earlier received electronic documents.

As a result, over time the database 150 may store a plurality of associated records that have values for an order receipt, shipping confirmation, and delivery notification for the same purchase or transaction, each having been processed with a different final template, but related in the database. This approach may facilitate rapid searches and retrieval of all substantive content related to an order, confirmation, shipment, and delivery of goods for a single transaction, or other more efficient data retrieval operations.

5. Pricing Analytics

In an embodiment, receipt processing computer 110 may implement pricing analytics logic that is configured to estimate an approximate market price for goods represented in database 150 that were purchased earlier. For example, over time, database 150 may accumulate records for purchases of the same product, or similar products, by a large number of unrelated users who have contributed transaction records to the system via forwarding or providing electronic receipts. The pricing analytics logic may be configured to search the database 150 via a query that specifies a particular product and to retrieve all purchase prices for that product over a specified time period. Based upon those prices, a projection to an estimated present market price may be performed, based upon cost of living data values, inflation values or other market indicators as well as by applying straight-line depreciation, other forms of depreciation, or other loss of value factors. Further, if the database 150 contains records of offers to purchase other units of the same product or similar products, then the amounts of the offers may be used as indicators of current market price.

The pricing analytics logic may provide the estimated current market price as output in a report, or in an alert message to a user, or in a suggestion message to a user that prompts the user to list the product for sale, or in other ways.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
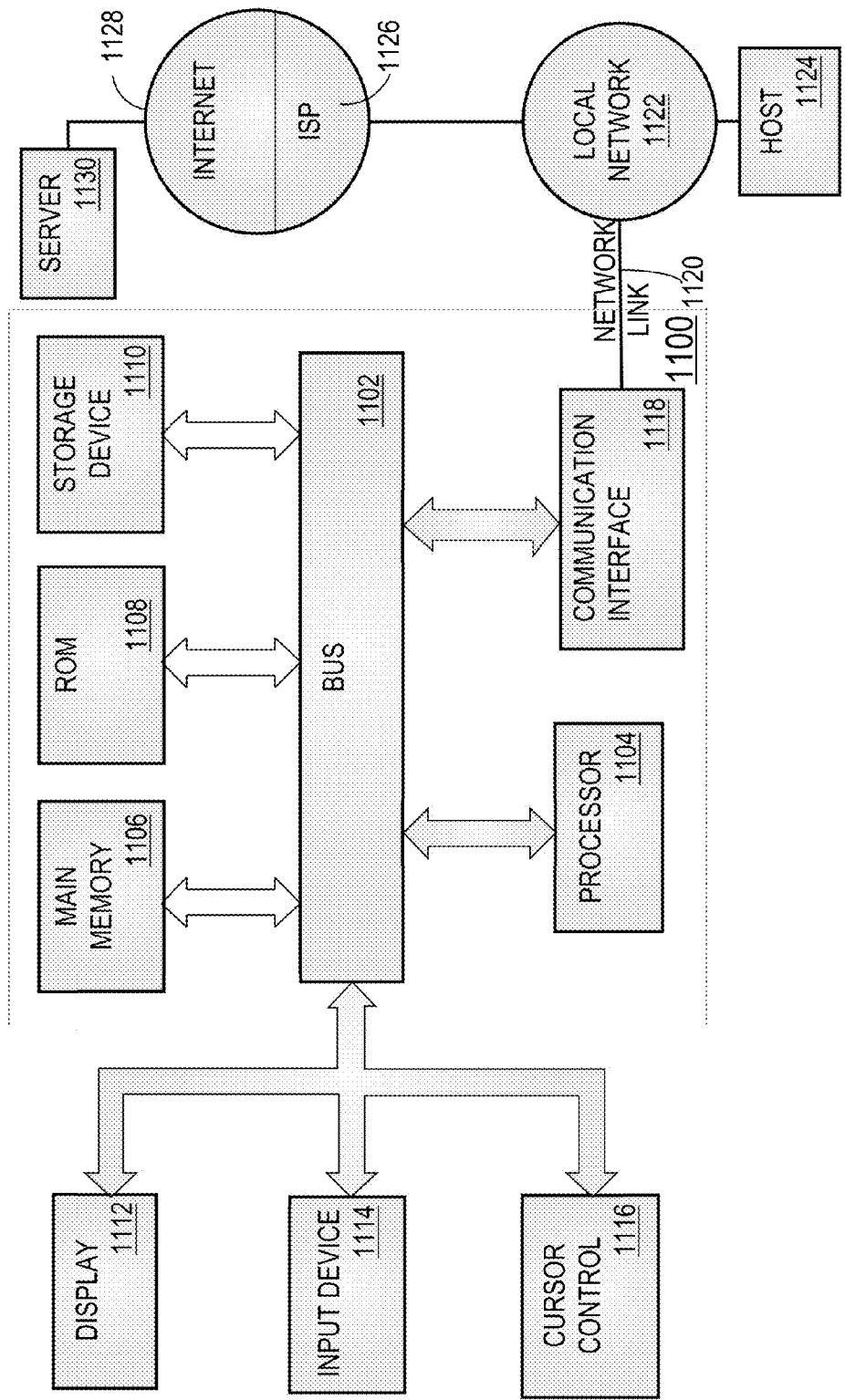
FIG. 11 illustrates an example computer system with which an embodiment may be used.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:

using a computer, receiving a first electronic document, wherein the first electronic document is structured according to a document structure, contains a plurality of content elements separate from the document structure, and contains a plurality of field identifiers and field values;

using the computer, generating, based only upon the document structure and not using the content elements, a fingerprint value for the first electronic document by applying a hash function over a document object model (DOM) of the first electronic document;

using the computer, determining whether the fingerprint value is in a stored fingerprint map of known fingerprint values;

using the computer, generating an intermediate template based upon the first electronic document, and receiving input specifying one or more modifications to the intermediate template, wherein the modifications specify changes to the field labels, and storing the final template based upon the modifications;

using the computer, when the fingerprint value is in the fingerprint map, retrieving the final template and a document parser from a plurality of parsers, each of which is associated with a different fingerprint value, parsing the first electronic document using the document parser to identify the field identifiers and field values, and storing the field values in a record in a database;

using the computer, when the fingerprint value is not in the fingerprint map, creating and storing a new final template associated with the fingerprint value for the first electronic document, wherein the new final template comprises field labels corresponding to the field identifiers of the first electronic document, and creating and storing a new document parser associated with the new final template that is configured to locate other field identifiers in other electronic documents that match the field identifiers of the first electronic document, and to extract other field values associated with the other field identifiers.

2. The method of claim 1 wherein the final template comprises a plurality of regular expressions.

3. The method of claim 1 wherein the first electronic document is an electronic receipt.

4. The method of claim 1 wherein the first electronic document is in Hypertext Markup Language (HTML) format, is structured according to the document object model (DOM) and contains the plurality of content elements separate from the DOM.

5. The method of claim 1 wherein each of the modifications comprises a selection of a range of text and a key-value pair specifying the field label associated with the range of text and a label value indicated at the field label.

6. The method of claim 1 wherein each of the modifications comprises a selection of a link and a key-value pair specifying the field label associated with the link and a link value indicated at the field label.

7. The method of claim 1 wherein the first electronic document comprises HTML source code and further comprising generating the final template by substituting, in a copy of the first electronic document, the field labels for one or more tag values in the HTML source code and storing, in the database, one or more records specifying the field labels and one or more attributes of the field labels.

8. The method of claim 1 wherein the document parser comprises data extraction logic that is configured to identify the field identifiers and field values, and normalization logic that is configured to normalize the field values after identification and extraction.

9. A data processing system comprising:
one or more processors;
a document buffer coupled to the one or more processors and that is configured to receive a plurality of electronic documents from a distributed plurality of user computers;
one or more computer-readable non-transitory storage media storing fingerprint generating instructions that are programmed to perform, using the one or more processors:
receiving a first electronic document from the document buffer, wherein the first electronic document is structured according to a document structure, contains a plurality of content elements separate from the document structure, and contains a plurality of field identifiers and field values;
generating, based only upon the document structure and not using the content elements, a fingerprint value for the first electronic document by applying a hash function over a document object model (DOM) of the first electronic document;
determining whether the fingerprint value is in a stored fingerprint map of known fingerprint values;
generating an intermediate template based upon the first electronic document, and receiving input specifying one or more modifications to the intermediate template, wherein the modifications specify changes to the field labels, and storing the final template based upon the modifications;
when the fingerprint value is in the fingerprint map, retrieving the final template and a document parser that are associated with the fingerprint value, parsing the first electronic document using the document parser to identify the field identifiers and field values, and storing the field values in a record in a database;
using a parser generator, when the fingerprint value is not in the fingerprint map, creating and storing a new final template for the first electronic document, wherein the new final template comprises field labels corresponding to the field identifiers, and creating and storing a new document parser that is configured to locate other field identifiers in other electronic documents that match the field identifiers of the first electronic document, and to extract other field values associated with the other field identifiers.

10. The data processing system of claim 9, wherein the final template comprises a plurality of regular expressions.

11. The data processing system of claim 9, wherein the first electronic document is an electronic receipt.

12. The data processing system of claim 9, wherein the first electronic document is in Hypertext Markup Language (HTML) format, is structured according to the document object model (DOM) and contains the plurality of content elements separate from the DOM.

13. The data processing system of claim 9, wherein each of the modifications comprises a selection of a range of text and a key-value pair specifying the field label associated with the range of text and a label value indicated at the field label.

14. The data processing system of claim 9, wherein each of the modifications comprises a selection of a link and a key-value pair specifying the field label associated with the link and a link value indicated at the field label.

15. The data processing system of claim 9, wherein the first electronic document comprises HTML source code and further comprising generating the final template by substituting, in a copy of the first electronic document, the field labels for one or more tag values in the HTML source code and storing, in the database, one or more records specifying the field labels and one or more attributes of the field labels.

16. The data processing system of claim 9, wherein the document parser comprises data extraction instructions that are configured to identify the field identifiers and field values, and normalization instructions that are configured to normalize the field values after identification and extraction.

* * * * *